(12) United States Patent
Dezonno et al.

(10) Patent No.: US 7,466,686 B2
(45) Date of Patent: Dec. 16, 2008

(54) MULTI-PROTOCOL AGENT TELEPHONE SYSTEM

(76) Inventors: Anthony J. Dezonno, 233 Pinewood La., Bloomingdale, IL (US) 60108; Michael C. Hollatz, 10415 Fair La., Huntley, IL (US) 60142

( * ) Notice: Subject to any disclaimer, the term of this patent is extended or adjusted under 35 U.S.C. 154(b) by 825 days.

(21) Appl. No.: 09/997,912

(22) Filed: Nov. 30, 2001

(65) Prior Publication Data
US 2003/0103489 A1    Jun. 5, 2003

(51) Int. Cl.
*H04L 12/28* (2006.01)
*H04L 12/66* (2006.01)
*H04L 12/50* (2006.01)
*H04J 15/00* (2006.01)
*H04J 3/16* (2006.01)

(52) U.S. Cl. ............... 370/351; 370/352; 370/354; 370/355; 370/356; 370/357; 370/400; 370/401; 370/464; 370/465; 370/466

(58) Field of Classification Search .......... 370/351, 370/466, 400
See application file for complete search history.

(56) References Cited

U.S. PATENT DOCUMENTS

| | | | |
|---|---|---|---|
| 5,127,004 A | 6/1992 | Lenihan et al. | |
| 5,140,611 A | 8/1992 | Jones et al. | |
| 5,268,903 A | 12/1993 | Jones et al. | |
| D344,521 S | 2/1994 | Dezonno et al. | D14/241 |
| 5,465,286 A * | 11/1995 | Clare et al. | 379/32.04 |
| 5,526,416 A | 6/1996 | Dezonno et al. | 379/265 |
| 5,857,018 A * | 1/1999 | Sumner et al. | 379/265.13 |
| 5,917,827 A * | 6/1999 | Cantwell | 370/466 |
| 5,920,622 A * | 7/1999 | Erb et al. | 379/204.01 |
| 5,982,854 A * | 11/1999 | Ehreth | 379/56.2 |
| 5,999,965 A * | 12/1999 | Kelly | 709/202 |
| 6,064,653 A * | 5/2000 | Farris | 370/237 |
| 6,097,806 A | 8/2000 | Baker et al. | |
| 6,108,562 A * | 8/2000 | Rydbeck et al. | 455/552.1 |
| 6,111,893 A * | 8/2000 | Volftsun et al. | 370/466 |
| 6,289,373 B1 | 9/2001 | Dezonno | |
| 6,324,167 B1 * | 11/2001 | Starr | 370/250 |
| 6,337,849 B1 * | 1/2002 | Smith et al. | 370/230 |
| 6,343,220 B1 * | 1/2002 | Van Der Salm | 455/552.1 |
| 6,490,252 B1 * | 12/2002 | Riggan et al. | 370/237 |
| 6,526,046 B1 * | 2/2003 | Carew | 370/352 |
| 6,574,216 B1 * | 6/2003 | Farris et al. | 370/352 |
| 6,628,617 B1 * | 9/2003 | Karol et al. | 370/237 |

(Continued)

*Primary Examiner*—Edan Orgad
*Assistant Examiner*—Blanche Wong

(57) ABSTRACT

An agent telephone system for use in a transaction processing system, where the transaction processing system is configured to couple an incoming telephone call with an agent of the agent telephone system and to route the incoming telephone call over one of a plurality of communication networks, where the communication networks utilize differing communication protocols. The agent telephone system includes a microprocessor and a memory operatively coupled to the microprocessor. An agent microphone and agent speaker are included for transmission and reception of audio information, respectively. The agent telephone system includes a conversion device configured to operatively couple the agent microphone and the agent speaker to the microprocessor, and an input multiplexer operatively coupled to the microprocessor, where the microprocessor is configured to control selection of one of a plurality of input lines of the multiplexer. A plurality of network interfaces are configured to operatively couple a selected communication network to the corresponding input line of the multiplexer so as to permit communication between the caller and the agent of the agent telephone system over the selected communication network.

21 Claims, 4 Drawing Sheets

U.S. PATENT DOCUMENTS

| | | | |
|---|---|---|---|
| 6,704,411 B1 * | 3/2004 | Nishidate | 379/265.09 |
| 6,707,820 B1 * | 3/2004 | Arndt et al. | 370/395.2 |
| 6,731,957 B1 * | 5/2004 | Shamoto et al. | 455/574 |
| 6,798,769 B1 * | 9/2004 | Farmwald | 370/352 |
| 6,801,519 B1 * | 10/2004 | Mangal | 370/349 |
| 6,801,777 B2 * | 10/2004 | Rusch | 455/452.2 |
| 6,826,272 B1 * | 11/2004 | Dalrymple et al. | 379/220.01 |
| 6,829,234 B1 * | 12/2004 | Kaplan et al. | 370/352 |
| 6,868,060 B2 * | 3/2005 | Barzegar et al. | 370/228 |
| 2001/0003522 A1 * | 6/2001 | Masuhiro | 370/237 |
| 2002/0116464 A1 * | 8/2002 | Mak | 709/206 |
| 2002/0133596 A1 * | 9/2002 | Border et al. | 709/227 |
| 2002/0181670 A1 * | 12/2002 | Myers et al. | 379/88.13 |
| 2002/0191621 A1 * | 12/2002 | Jha | 370/401 |
| 2003/0081619 A1 * | 5/2003 | Phillips et al. | 370/400 |
| 2006/0034262 A1 * | 2/2006 | Pogossiants et al. | 370/352 |

* cited by examiner

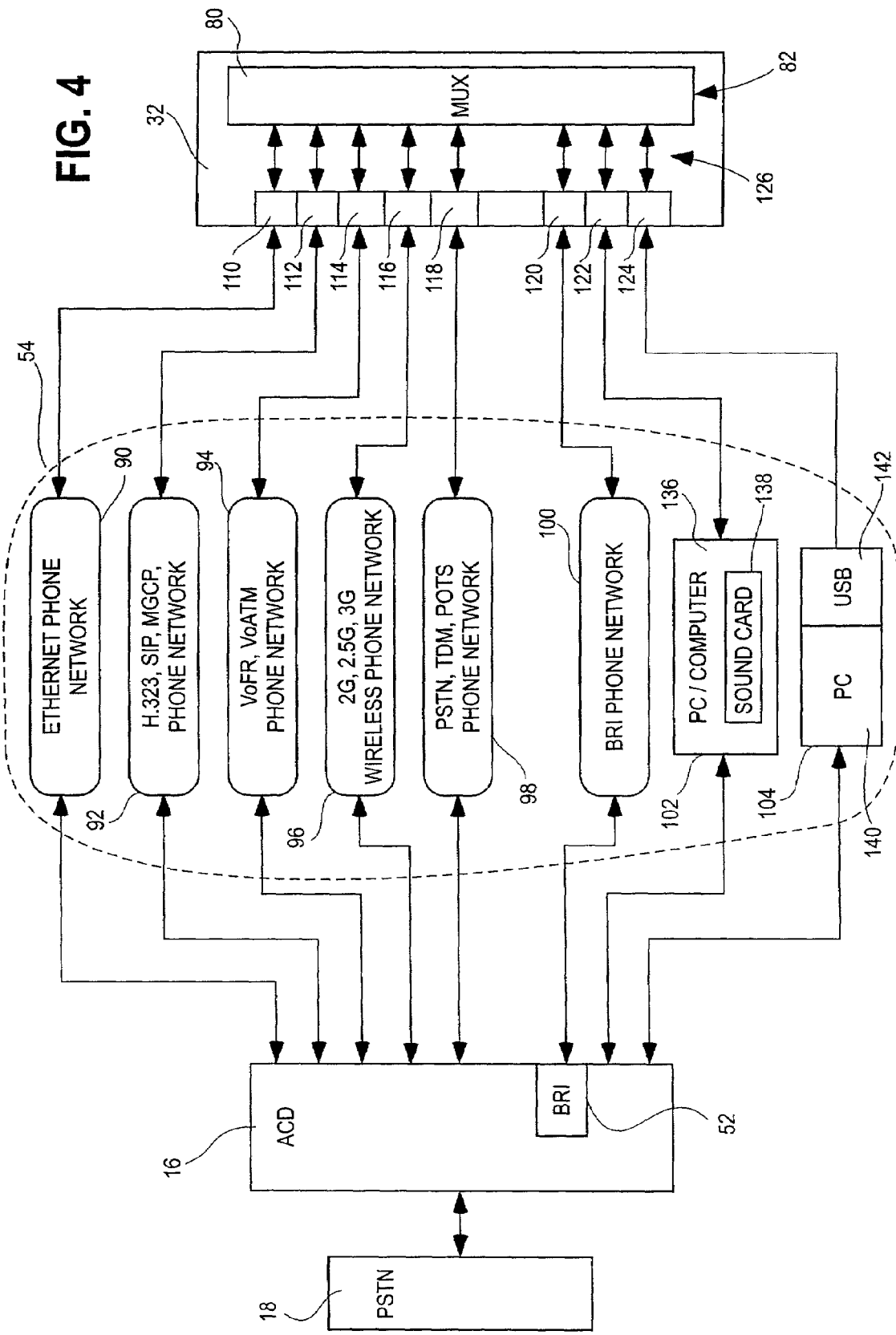

MULTI-PROTOCOL AGENT TELEPHONE SYSTEM

FIELD OF THE INVENTION

The present invention relates generally to automatic transaction processing systems, and more specifically to an agent telephone station responsive to a plurality of communication protocols.

BACKGROUND

Systems which automatically distribute customer contacts or calls (generically referred to as "ACD" or transaction processing systems) are often employed in telemarketing environments in which agents stationed at agent telephone sets answer many different types of telephone calls and other types of customer contacts (e.g., VoIP, emails, facsimile, chat room dialog, instant messages, other Internet contacts, etc.) from customers during a work day. As referred to herein, an ACD may be referred to as an automatic call distributor, an automatic contact distributor, or a transaction processing system because it handles a variety of communication media. In other words, the ACD or transaction processing system handles many forms of communication, not just telephone calls in which a potential customer speaks with an agent. The term "ACD" may apply to any type of transaction processing system, and need not apply only to dedicated telemarketing systems or automatic call distributors. In some known ACD's, the agent may receive certain information about the type of customer call (i.e. contact) on a visual display at the agent set when a call or contact is distributed to the agent. An ACD is any such system which performs some of these functions and, for example, may employ a wide variety of architectures including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next contact that the agent processes may be on behalf of the same vendor or on behalf of a different vendor. In another embodiment, ACD's may be used exclusively by or on behalf of a single vendor such that all of the contacts processed by the agent involve one particular vendor.

Often, a customer call is distributed to an agent that involves interactive voice dialog. This means a normal two-way verbal exchange. In this situation, an agent is selected based on various criteria, such as specialized knowledge concerning the product or service in which the customer is interested. The agent may also be selected to receive the incoming call based on his or her verbal skills and conversational abilities. U.S. Pat. No. 6,222,919 B1 relates to agent skills based on product knowledge or skills pertinent to the subject matter of the voice transaction, and is owned by the assignee of the present invention, and is hereby incorporated by reference in its entirety.

An ACD, however, may also distribute a non-voice dialog contact or call to the agent. This does not involve direct two-way speech between the agent and the customer or caller. Non-voice dialog communication may be, for example, emails, facsimile, chat room dialog, instant messaging, Internet, etc. and the like. This is becoming more common as Internet traffic and electronic sales transactions increase.

An agent station or agent computer may be operatively coupled to the ACD, often through a basic line rate interface (BRI), which handles the voice channel. If the interface fails or the line connecting the ACD to the agent station malfunctions, the telephone call may be lost. It is desirable to have multiple redundant systems or circuits that permit the ACD to route a telephone call to the agent station over alternate lines using different communication formats. Although some known ACD's provide multiple lines to the agent station, such lines are of the same format, meaning that the multiple lines, for example, are all BRI type communication lines or are all local area network type lines of the same type and protocol. A need exists for an agent station to handle a plurality of different communication formats to increase redundancy and flexibility.

SUMMARY

The disadvantages of present transaction processing systems are substantially overcome with the present invention by providing a novel agent telephone system for use in a transaction processing system.

More specifically, one specific embodiment of the present invention includes an agent telephone system for use in a transaction processing system. The transaction processing system is configured to couple an incoming telephone call with an agent of the agent telephone system and to route the incoming telephone call over one of a plurality of communication networks, where the communication networks utilize differing communication protocols. The agent telephone system includes a microprocessor and a memory operatively coupled to the microprocessor. An agent microphone and agent speaker are included for transmission and reception of audio information, respectively. The agent telephone system includes a conversion device configured to operatively couple the agent microphone and the agent speaker to the microprocessor, and an input multiplexer operatively coupled to the microprocessor, where the microprocessor is configured to control selection of one of a plurality of input lines of the multiplexer. A plurality of network interfaces are configured to operatively couple a selected communication network to the corresponding input line of the multiplexer so as to permit communication between the caller and the agent of the agent telephone system over the selected communication network.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 4 is a block diagram of a specific embodiment of a transaction processing system coupled to an agent telephone system through one of a plurality of communication networks;

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
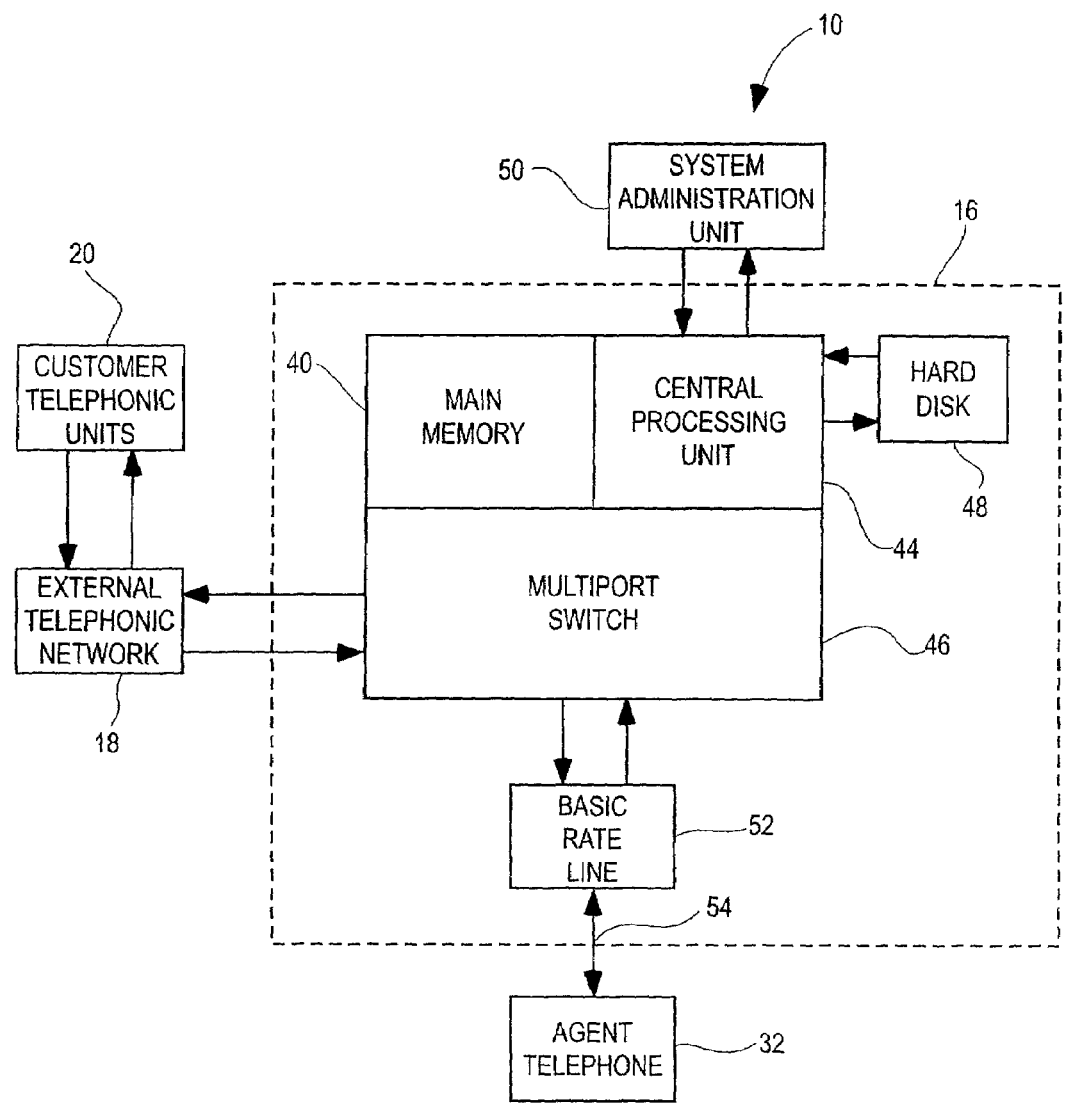
FIG. 1 is a block diagram of a specific example of a known transaction processing system.

Referring now to FIG. 1, an exemplary embodiment of a telephonic system 10 for facilitating routing of incoming calls or contacts ("transactions") to agents associated with an transaction processing system 16. The transaction processing system 16 may also be referred to as a transaction processing system, automatic call distributor or automatic contact distributor system (ACD). The ACD 16 processes both voice-dialog communications or transactions, as well as non-voice dialog communications and transactions, as described hereinafter. The present invention may be implemented in numerous types and sizes of systems for distributing calls to selected ones of a plurality of agents. One example of an ACD system that may be used in the present invention is the SPECTRUM ACD product, available from Rockwell Electronic Commerce Corp. of Illinois.

Other types of call distribution systems including, for example, distribution systems or those using one or more personal computers or servers, may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," U.S. Pat. No. 5,127,004, issued to Lenihan et al. on Jun. 30, 1992, entitled "Tone and Announcement Message Code Generator for a Telephonic Switching System and Method," U.S. Pat. No. 6,289,373 B1, issued to Dezonno on Sep. 11, 2001, entitled "Method of Processing E-Mail in an Automatic Call Distributor," and U.S. Pat. No. 6,097,806, issued to Baker et al. on Aug. 1, 2000, entitled "ACD with Multi-Lingual Agent Position," the disclosures of which are hereby incorporated by reference in their entirety.

A customer or caller may be connected to the ACD 16 through a public switched telephone network (PSTN) 18, which caller may connect to the PSTN through a standard telephone set 20, although a computer, cellular telephone, or any suitable communication device may be used. Note that the term "caller" as used herein does not necessarily mean that the contact or person using the telephone 20, for example, initiated the call to the agent. Notably, the agent may have initiated the call to the contact. Accordingly, the term "caller" shall broadly refer to the contact or potential customer even though the agent may have originated or initiated the call or contact. Additionally, the term "call" may be a telephone call, or it may be any other form of communication (emails etc.) as set forth above.

In the illustrated example ACD 16 of FIG. 1, an agent telephone station 32 (also referred to as agent station and/or agent terminal) is shown coupled to the ACD. For purposes of illustration, only one agent telephone station 32 is shown, but any suitable number of agent stations may be coupled to the ACD 16. The agent stations 32 may also comprise agent station computers, which may be, for example, personal computer systems or any other suitable computer system.

Figure 2:
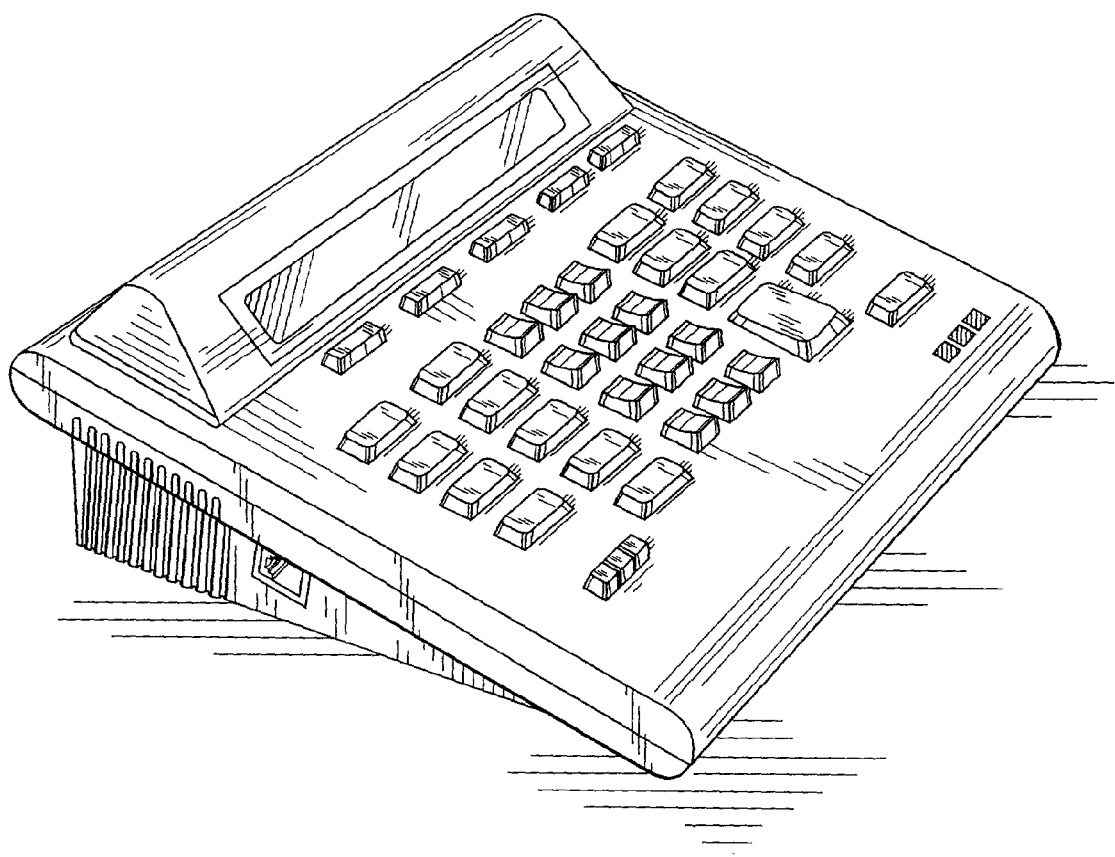
FIG. 2 is a pictorial representation of a specific embodiment of an agent telephone system.

Referring now to FIG. 2, one specific embodiment of the agent telephone station 32 is shown generally in pictorial form. The agent telephone station 32 may be similar in overall appearance to the SPECTRAVIEW Model 100 agent telephone, available from Rockwell Electronic Commerce Corp. of Illinois. The agent telephone 32 may also be similar in appearance to the agent telephone shown in Des. 344,521, which is owned by the assignee of the present invention, and is hereby incorporated by reference in its entirety.

Referring back to FIG. 1, the ACD 16 may comprise hardware and/or software and, for example, may include a main memory 40, a central processing unit 44 and a multiport switch 46, each of which may be separate units, distributed components, or integrated at a single location or single cabinet. The multiport switch 46 is coupled to the PSTN 18, which in turn, is connected to customer telephones 20 or other communication devices. The central processing unit 44 may include storage, such as hard disk storage 48, and may also be coupled to a system administration unit 50. The ACD 16 is connected through a suitable communication link to the plurality of agent telephone stations 32, for example, through a basic rate line 52 (also referred to as BRI or basic rate interface). Additionally, the ACD 16 may be linked to the agent telephone 32 either remotely, or directly though a plurality of communication networks 54 where the multiple communication networks may redundantly link a single agent telephone 32 with the ACD 16. The communication networks are shown generally as 54 and are described in greater detail below.

The illustrated ACD 16 may handle voice communication and may also handle non-voice communication, such as emails, facsimile, chat room dialog, instant messaging, Internet, etc. Non-voice dialog communication is another form of contact communication and the ACD 16, when configured and coupled to appropriate hardware and/or software devices, is not limited to processing voice-based telephone calls. The ACD 16 may be a single integrated device, or may include distributed hardware and software. In one specific embodiment, the SPECTRUM ACD product available from Rockwell Electronic Commerce Corp. may be used. Alternatively, in another specific embodiment, the TRANSCEND ACD product available from Rockwell Electronic Commerce Corp. may also be used. Note also, that the ACD may also be a PBX (private branch exchange) device used to route incoming telephone calls to an appropriate destination telephone.

Figure 3:
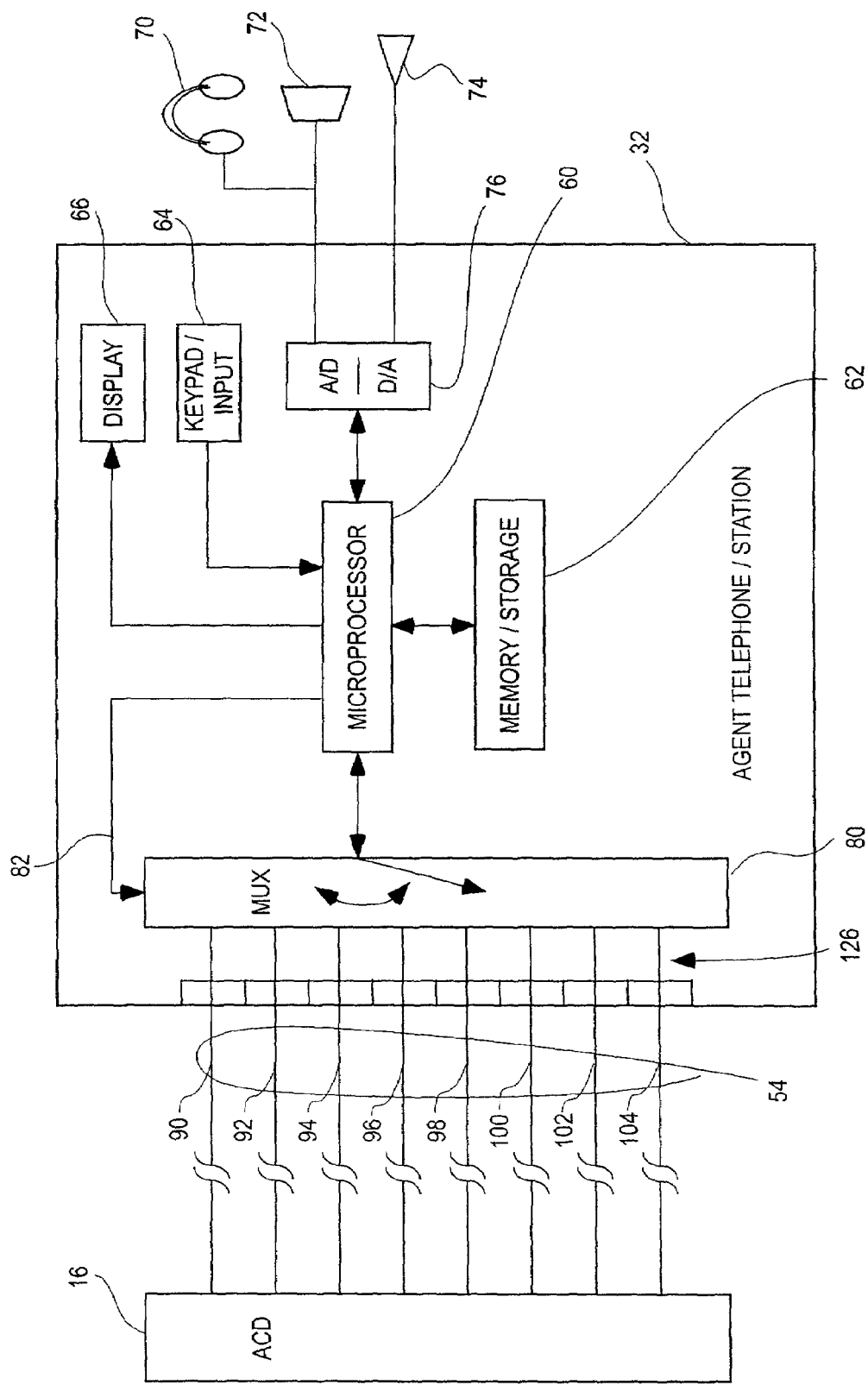
FIG. 3 is a block diagram of a specific embodiment of an agent telephone system.

Referring now to FIG. 3, an example of the agent telephone system 32 is shown in greater detail. The example of agent telephone system 32 may include a microprocessor 60 and associated memory 62 as shown. Note that the microprocessor may be any suitable processor, computer, central processing unit (CPU), microprocessor, RISC (reduced instruction set computer), work station, single chip computer, distributed processor, server, controller, micro-controller, discrete logic device, and the like. The associated memory 62 may also include hard disc storage, as is known in the art. A keypad or other input device 64 may also be coupled to the microprocessor 60 so as to provide the agent with a means for dialing telephone numbers or entering certain data. Optionally, a display 66, such as a multi-line LCD display, may be coupled to the microprocessor 60. The display 66 may also be in the form of a larger display, such as a display screen, as is known in the art. Any suitable display may be used.

The "human interface" includes a head set 70 or loudspeaker 72 (or earpiece) configured to permit the agent to hear the voice conversation. Accordingly, a microphone 74 is also provided to permit the agent to communicate with the caller. Because the loudspeaker 72 and microphone 74 are inherently analog devices, each are coupled to a conversion device 76, which preferably provides both analog-to-digital conversion and digital-to-analog conversion, as is known in the art. The conversion device 76 is operatively coupled to the microprocessor 60. Any suitable analog-to-digital converter and digital-to-analog converter may be used. Of course, the conversion device may be two separate devices, namely, an analog-to-digital converter and a digital-to-analog converter, respectively.

An input multiplexer 80 may operatively coupled to the microprocessor 60. Note that the input multiplexer 80 may be in the form of a switch so that at any given time, only one of its inputs is routed to the microprocessor 60. Note that the input multiplexer 80 is a switch, and is not a multiplexer in the sense of time-division multiplexing where multiple input signals are routed to a destination on a repetitive time-slice basis. As shown in the specific embodiment of FIG. 3, the input multiplexer 80 may be 1 of 8 switch, but any suitable number of inputs may be accepted. The microprocessor 60 controls selection of the multiplexer inputs via a control line 82, as will be described in greater detail below.

Referring now to the specific embodiment of FIGS. 3 and 4, FIG. 4 shows the plurality of communication networks 54 coupled between the ACD 16 and the agent telephone 32. In FIG. 3, the communication networks are shown only as a plurality of lines 54 for purposes of illustration only. Similarly, for purposes of illustration, only eight specific communication networks 54 are shown in FIG. 4, but additional communication networks or fewer communication networks may be used without departing from the scope of the present invention.

Some of the specific examples of communication networks 54 that may be used are follows: an Ethernet network 90, H.323 protocol network 92, SIP network (Session Initiation Protocol, also shown as 92), MGCP network (Media Gateway Control Protocol, also shown as 92), VoFR network (Voice over Frame Relay) 94, VoATM network (Voice over Asynchronous Transport Mode, also shown as 94), 2G/2.5G/3G wireless network 96, PSTN network 98 (Public Switched Telephone Network, also shown as including a TDM network, T1 network and POTS or plain old telephone system), BRI network 100 (basic rate interface), sound card/PC network 102 and USB (universal serial bus) network 104. Any suitable communication network may be used.

Each communication network (90, 92, 94, 96, 98, 100, 102, 104) is operatively coupled to a corresponding network interface 110, 112, 114, 116, 118, 120, 122, 124, which may be contained in or incorporated into the agent station telephone 32. Each network interface (110, 112, 114, 116, 118, 120, 122, 124), in turn, is routed into one of the eight inputs, shown generally as 126, of the input multiplexer 80. As described above, the microprocessor 60 (FIG. 3) controls selection of the communication network 54 through which to route the incoming telephone call to the agent telephone.

For the example illustrated, with respect to the categories of protocol associated with the various communication networks 54, preferably each network, except for the 2G/2.5G/3G wireless network 96, the PSTN network 98 (including TDM, T1 and POTS), and the BRI network 100, utilize packet-based communication protocol, as is known in the art. The PSTN network 98 (including TDM, T1, and POTS) and the BRI network 100, utilize circuit-switched protocol, as is known in the art.

The illustrated agent telephone system 32 is extremely flexible and may be connected to the ACD 16, or to a PBX by many different network connections. This may reduce costs when implementing new network structures because the agent telephone system 32 need not be replaced when the ACD 16 is upgraded or modified. Additionally, the connections between the ACD 16 and the agent telephone system 32 are redundant, and a failure in one network 54 will not preclude rerouting of the incoming telephone call via an alternate network. In fact, the specific embodiment of FIG. 4 shows eight distinct networks that may be used to route any particular incoming telephone call to a selected agent telephone system 32. Further, packet-based communication networks used to route voice communication may be less costly than direct circuit-switched telephone lines.

Because the incoming telephone call may be routed to the agent telephone over any of the communication networks 54, the system is extremely fault tolerant via the multiple redundant communication paths. The microprocessor 60 may detect a failure of a communication network 54 through which the incoming telephone call is coupled to the agent telephone. Failure detection may be performed in several ways. In one specific embodiment, a "keep-alive" signal may be periodically polled by the microprocessor 60. The keep-alive signal is generated via periodic "handshake" signals sent between the ACD 16 and the agent telephone 32. These signals occur in the background and are essentially transparent to the caller and the agent. Termination of such signals informs the microprocessor 60 of a network failure, as is known in the art.

Alternatively, a link-status signal may inform the microprocessor 60 of a network failure. As is known in the art, a link-status signal may be in the form of a predetermined voltage on a specific line or pin in the respective network interfaces (110, 112, 114, 116, 118, 120, 122, 124), which may be monitored by the microprocessor 60. If the cable that forms part of the network is severed or becomes disconnected or is otherwise disabled, the predetermined voltage level may change or may drop below a minimum value, thus informing the microprocessor 60 of the failure. The display 66 may also indicate to the agent that one of the communication networks 54 have failed. An icon, text message or other visual indication may be displayed to the user upon detection of a communication network failure. Alternatively, an audible indication may be provided by the agent telephone 32 to inform the agent that one the communication networks 54 has failed. In that way, the agent can expect to be reconnected shortly to the incoming call that was unavoidably disconnected.

If the microprocessor 60 detects a failure in the communication network, the microprocessor may issue the control signal 82 to the multiplexer 80 to route the incoming telephone call (more specifically, the "reconnected or rerouted" incoming telephone call) through a different communication network so as to reestablish communication between the ACD 16 and the agent. Note that the failure in the communication network 54 did not cause the ACD 16 to "lose" the incoming telephone call. That is, the incoming telephone call to the ACD 16 routed initially via the PSTN is intact, and the ACD 16 maintains the call integrity even though the communication network 54 to the agent telephone system 32 may have failed.

In one specific embodiment, the ACD 16 will automatically reconnect and re-route the "disconnected" incoming telephone call over an alternate communication network, and the agent telephone 32 will accept the next telephone call as a reconnection of the previously disconnected communication. This assumes that the ACD 16 will immediately reroute the disconnected telephone call to the agent telephone system 32 over another communication network 54 before routing a different or new incoming telephone call to that agent.

Alternatively, the system may make use of "call appearance" indicators or call identification set-up messages, which assigns a specific identification number to each telephone call. Based on such identification numbers, the agent telephone 32 may indicate to the agent whether a new incoming telephone call is truly new, or whether it is a reconnection of the previously disconnected communication.

With respect to the illustrated example of communication networks 54 of FIG. 4, the Ethernet communication network 90 may be a known local area network (LAN), where the ACD 16 contains an Ethernet network card or circuitry. Similarly, the corresponding network interface 110 may also be an Ethernet network card or circuit, as is known in the art. Preferably, the Ethernet protocol is a "100 base T" protocol.

The H.323 communication network 92 is also a packet-based network, and is similar to the Ethernet communication network 90. As shown in FIG. 4, the H.323 communication network 92 may also be SIP based or MGCP based, as those protocols are related, as is known in the art. Similarly, the corresponding network interface 112 in the agent telephone system 32 may also be an H.323, SIP, or MGCP based communication circuit, as is known in the art.

The VoFR and VoATM communication networks 94 are closely related to each other, and thus are shown in the single block 94 in FIG. 4. Again, these networks are packet-based networks. The VoFR is a protocol that runs on top of frame relay rather than on top of Internet Protocol (IP), as is known in the art. Similarly, the corresponding network interface 114 may also be a VoFR and VoATM based communication circuit, respectively, as is known in the art.

The wireless communication network 96 may generally include 2G, 2.5G and 3G wireless protocols. Of course, although each communication network 54 is shown generally as a single block, implementation of that block may include may circuits, cards, structures, and software. For example, the wireless communication network 96, although shown as the single block, may include (but not shown) wireless transmitters, transmission towers having antennas, amplifiers, and relays, base station, repeaters, wireless receivers and the like.

The PSTN communication network 98 also may include the TDM, T1, and POTS networks. These networks 98 are circuit-switched networks rather than packet-based networks, as is known in the art, and are typically analog based networks. Although not specifically shown, a telephonic adaptor may be used to connect the POTS telephone to the agent telephone system 32. Similarly, the corresponding network interface 118 may also be, for example, a PSTN interface, TDM interface, T1 interface, and/or POTS interface, as is known in the art.

The BRI communication network 100 is preferably coupled to a BRI or BRL (basic rate line) card 52 in the ACD 16. A corresponding BRI interface 120 may be included in the agent telephone system 32. The BRI communication network 100 is a circuit-switched network rather than a packet-based network, which typically handles analog voice communications, as is known in the art.

The sound card/PC network 102 may include a computer or PC 136 coupled between the ACD 16 and the agent telephone system 32. The computer 136 may include a sound card 138, as is known in the art. The sound card 138 may be, for example, a Soundblaster® audio card Model 32 PNP manufactured by Creative Labs Corporation, or the like. The sound card 138 may be configured to digitize incoming voice communication from the ACD 16 so as to provide digital voice data to the corresponding sound card/PC network interface 122 in the agent telephone system 32.

Similarly, the USB communication network 104 may also include a computer or PC 140 coupled between the ACD 16 and the agent telephone system 32. The computer 140 may include a USB interface 142, as is known in the art. Similarly, the corresponding network interface 124 may also be a USB interface, as is known in the art. Note that the computer 140 may be the same computer as utilized in the sound card/PC network 102, thus, a single computer or PC may include both the sound card 138 and the USB circuitry 142.

Specific embodiments of a Multi-Protocol Agent Telephone System according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. In a system, an agent telephone system coupled to an automatic call distributor and an external switch, the automatic call distributor configured to provide communication paths for an incoming telephone call from the external switch to the agent telephone system and to route the incoming telephone call over one of a plurality of communication networks connected between the automatic call distributor and the agent telephone system, the plurality of communication networks utilizing different communication protocols, the agent telephone system comprising:

a microprocessor;

memory operatively coupled to the microprocessor;

an agent microphone and agent speaker for transmission and reception of audio information, respectively;

a conversion device operatively coupled to the agent microphone and to the agent speaker, and the conversion device also operatively coupled to the microprocessor;

an input switch multiplexer operatively coupled to the microprocessor, wherein the microprocessor controls selection of one of a plurality of input lines of the switch multiplexer;

a plurality of network interfaces each connected to a respective one of the plurality of input lines of the switch multiplexer, each of the plurality of network interfaces also connected to one of the plurality of communication networks, so as to establish communication between a caller of the incoming telephone call from the external switch and an agent of the agent telephone system through the automatic call distributor over one of the plurality of communication networks; and wherein the agent telephone system establishes communication between the caller and the agent over a first communication network of the plurality of communication networks and then detects a failure of the first communication network, the failure causing disconnection of the incoming telephone call between the agent telephone system and the automatic call distributor resulting in a partially disconnected call, the microprocessor, in response to the disconnection, issues a control signal to the switch multiplexer to route the partially disconnected call through a second communication network of the plurality of communication networks so as to re-establish communication between the caller and the agent, the first and second communication networks utilizing different communication protocols.

2. The agent telephone system according to claim 1 wherein at least one of the plurality of communication networks are selected from the group consisting of an Ethernet network, USB network, H.323 protocol network, SIP network, MGCP network, VoFR network, VoATM network, TDM network, T1 network, PSTN network, POTS network, 2G wireless network, 2.5G wireless network, and 3G wireless network.

3. The agent telephone system according to claim 1 wherein at least one of the plurality of network interfaces are selected from the group consisting of an Ethernet network interface, USB network interface, H.323 protocol network interface, SIP network interface, MGCP network interface, VoFR network interface, VoATM network interface, TDM network interface, T1 network interface, PSTN network interface, POTS network interface, 2G wireless network interface, 2.5G wireless network interface, and 3G wireless network interface.

4. The agent telephone system according to claim 1 wherein at least one of the communication networks is a packet-switched based network.

5. The agent telephone system according to claim 1 wherein at least one of the communication networks is a circuit-switched based network.

6. The agent telephone system according to claim 1 wherein the agent telephone system detects the failure of the first communication network by loss of a link status indication.

7. The agent telephone system according to claim 1 wherein the agent telephone system detects a failure of the first communication network by loss of a keep-alive indication.

8. The agent telephone system according to claim 1 wherein each incoming call from the automatic call distributor has an assigned call indicator and the agent telephone system indicates to the agent whether a subsequent incoming telephone call is a new call or is a reconnection of a prior disconnection.

9. The agent telephone system according to claim 1 further including a communication network defined by a computer having a sound card therein, the computer operatively coupled between the automatic call distributor and an agent telephone, the sound card configured to digitize voice communication.

10. The agent telephone system according to claim 1 further including a communication network defined by a computer having a USB circuit therein, the computer operatively coupled between the automatic call distributor and an agent telephone, the USB circuit configured to facilitate transmission and reception of serial data.

11. A method for providing communication paths for an incoming call from an external switch to an agent telephone system through an automatic call distributor, the automatic call distributor coupled to the external switch and the agent telephone system, the automatic call distributor configured to route the incoming telephone call from the external switch to the agent telephone system over one of a plurality of communication networks connected between the automatic call distributor and the agent telephone system, each communication network having a corresponding network interface and utilizing different communication protocols, the method comprising the steps of:

providing the agent telephone system with a microprocessor, and operatively coupling the microprocessor to a memory;

providing the agent telephone system with at least one transducer configured to transmit and receive audio information, and operatively coupling the at least one transducer to the microprocessor through a conversion device;

providing the agent telephone system with a switch multiplexer and operatively coupling the switch multiplexer to the microprocessor, the switch multiplexer having a plurality of input lines and the plurality of input lines having a plurality of network interfaces, each of the plurality of network interfaces also connects to one of the plurality of communication networks;

controlling, by the microprocessor, selection of one of the plurality of input lines of the switch multiplexer, so as to establish communication between a caller of the incoming telephone call from the external switch and an agent of the agent telephone system through the automatic call distributor over one of the plurality of communication networks;

establishing, by the agent telephone system, communication between the caller and the agent over a first communication network of the plurality of communication networks; and detecting. by the agent telephone system, a failure of the first communication network, said failure causing disconnection of the incoming telephone call between the agent telephone system and the automatic call distributor resulting in a partially disconnected call, and issuing, by the microprocessor. a control signal, in response to the disconnection, to the switch multiplexer to route the partially disconnected call through a second communication network of the plurality of communication networks so as to reestablish communication between the caller and the agent, the first and second communication network utilizing different communication protocol.

12. The method according to claim 11 wherein at least one of the plurality of communication networks are selected from the group consisting of an Ethernet network, USB network, H.323 protocol network, SIP network, MGCP network, VoFR network, VoATM network, TDM network, Ti network, PSTN network, POTS network, 2G wireless network, 2.5G wireless network, and 3G wireless network.

13. The method 11 wherein at least one of the plurality of network interfaces are selected from the group consisting of an Ethernet network interface, USB network interface, H.323protocol network interface, SIP network interface, MGCP network interface, VoFR network interface, VoATM network interface, TDM network interface, T1 network interface, PSTN network interface, POTS network interface, 2G wireless network interface, 2.5G wireless network interface, and 3G wireless network interface.

14. The method according to claim 11 wherein at least one of the communication networks is a packet-switched based network.

15. The method according to claim 11 wherein at least one of the communication networks is a circuit-switched based network.

16. The method according to claim 11 wherein the agent telephone system detects the failure of the first communication network by detecting a loss of a link status indication.

17. The method according to claim 11 wherein the agent telephone system detects the failure of the communication network by detecting a loss of a keep-alive indication.

18. The method according to claim 11 wherein the agent telephone system accepts a next incoming call from the automatic call distributor as a reconnection of the disconnection.

19. The method according to claim 11 further including a display operatively coupled to the microprocessor.

20. The method according to claim 11 further including a communication network defined by a computer having a sound card therein, the computer operatively coupled between the automatic call distributor and an agent telephone, the sound card configured to digitize voice communication.

21. The method according to claim 11 further including a communication network defined by a computer having a USB circuit therein, the computer operatively coupled between the automatic call distributor and an agent telephone, the USB circuit configured to facilitate transmission and reception of serial data.

* * * * *